US012776974B2

(12) United States Patent
Das et al.

(10) Patent No.: US 12,776,974 B2
(45) Date of Patent: Oct. 27, 2026

(54) GRACEFUL TRANSITION IN A CONNECTIVITY TEST WHEN A DISCRIMINATOR IS CHANGED IN A SEAMLESS BIDIRECTIONAL FORWARDING DETECTION (S-BFD) REFLECTOR NODE

(71) Applicant: Ciena Corporation, Hanover, MD (US)

(72) Inventors: Sudipta Das, New Delhi (IN); Pankaj Verma, Kanpur (IN); Aditya Mittal, Gurgaon (IN)

(73) Assignee: Ciena Corporation, Fulton, MD (US)

( * ) Notice: Subject to any disclaimer, the term of this patent is extended or adjusted under 35 U.S.C. 154(b) by 240 days.

(21) Appl. No.: 18/798,436

(22) Filed: Aug. 8, 2024

(65) Prior Publication Data

US 2024/0406087 A1 Dec. 5, 2024

Related U.S. Application Data

(63) Continuation of application No. 17/699,754, filed on Mar. 21, 2022, now Pat. No. 12,068,932.

(30) Foreign Application Priority Data

Jan. 31, 2022 (IN) ............................ 202211005080

(51) Int. Cl.
*H04L 43/0811* (2022.01)
*H04L 43/10* (2022.01)

(52) U.S. Cl.
CPC .......... *H04L 43/0811* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 9,628,366 | B2 | 4/2017 | Majumdar et al. | |
| 11,108,689 | B1 | 8/2021 | Aggarwal et al. | |
| 2016/0261474 | A1 | 9/2016 | Raghavan et al. | |
| 2019/0222500 | A1 * | 7/2019 | Nainar | H04L 43/10 |
| 2019/0238448 | A1 * | 8/2019 | Pignataro | H04L 45/12 |
| 2020/0127909 | A1 | 4/2020 | Mittal et al. | |
| 2021/0250284 | A1 | 8/2021 | Aggarwal et al. | |
| 2021/0328915 | A1 | 10/2021 | Nainar et al. | |

* cited by examiner

*Primary Examiner* — Anh Ngoc M Nguyen
(74) *Attorney, Agent, or Firm* — Baratta Law PLLC; Lawrence A. Baratta, Jr.

(57) ABSTRACT

Systems and methods for performing connectivity checks, such as Seamless Bidirectional Forwarding Detection (S-BFD), are provided. A node is configured to operate in a network, the node is a Seamless Bidirectional Forwarding Detection (S-BFD) reflector node configured to operate an S-BFD session with an S-BFD initiator node. The node includes circuitry configured to, responsive to an S-BFD discriminator change in the S-BFD session to a new discriminator for the S-BFD session, cache an old discriminator for the S-BFD session, and receive, process, and respond to a S-BFD request from the S-BFD initiator node with an S-BFD response including one of the new discriminator or the old discriminator.

20 Claims, 8 Drawing Sheets

GRACEFUL TRANSITION IN A CONNECTIVITY TEST WHEN A DISCRIMINATOR IS CHANGED IN A SEAMLESS BIDIRECTIONAL FORWARDING DETECTION (S-BFD) REFLECTOR NODE

CROSS-REFERENCE

The present disclosure is a continuation of U.S. patent application Ser. No. 17/699,754, filed Mar. 21, 2022, the contents of which are incorporated by reference in their entirety.

TECHNICAL FIELD

The present disclosure generally relates to networking systems and methods. More particularly, the present disclosure relates to checking the connectivity between two nodes in a network, such as by using the Seamless Bidirectional Forwarding Detection (S-BFD) protocol, and enabling a graceful transition in S-BFD when a new discriminator value is applied to a reflector node.

BACKGROUND

Seamless Bidirectional Forwarding Detection (S-BFD), defined at least in RFC 7880, describes an optimized mechanism to monitor faults on unidirectional paths. The S-BFD protocol is configured to eliminate some of three-way handshaking aspects as defined in classical BFD (i.e., RFC 5880). Further, S-BFD defines an initiator node and a reflector node and are configured to monitor faults on unidirectional paths (e.g., Segment Routing (SR) policy tunnels, Label Switched Paths (LSPs) paths, Label Switched Paths (LSPs), etc.).

Initiator nodes may be configured to send S-BFD request packets in-band on the monitored unidirectional SR-policy tunnels. A reflector node may be arranged in the same administrative domain as one or more of the initiator nodes or may be arranged in a different administrative domain. The reflector node is configured to send S-BFD reply packets on Internet Protocol (IP) return paths back to the respective initiator nodes. Interior Gateway Protocol (IGP) and Border Gateway Protocol (BGP) can be used to advertise the S-BFD discriminator configured on the reflector node towards initiator nodes. The "discriminator" is a value used to identify each of the nodes in an S-BFD domain.

One problem with conventional S-BFD is that the S-BFD discriminator advertised by IGP or BGP will be used by S-BFD initiator sessions for monitoring paths towards the reflector node that hosts a reflector session. Any change in the reflector's discriminator will trigger a re-advertisement (e.g., via IGP, BGP, or the like) to all S-BFD initiator nodes. On reception of IGP/BGP updates with respect to S-BFD discriminator value changes, the initiator nodes normally have to update all configured S-BFD initiator sessions for the changed S-BFD discriminator value. These updates should happen in real-time to avoid any spurious S-BFD faults.

However, latency may result from this re-advertisement process, regardless of whether the initiators and reflector are within one administrative domain or multiple administrative domains. Also, the processing of this re-advertised discriminator value may lead to spurious faults. Further, these issues will be magnified with scaled initiator sessions operating at aggressive intervals (e.g., 3.3 ms, 10 ms, 20 ms, 50 ms, etc.).

Also, change in the S-BFD discriminator value may cause undesirable flaps in the network in unidirectional and IP-routed paths as well.

Any change to the reflector's S-BFD discriminator value should not result in S-BFD faults. Therefore, there is a need in the field of connectivity testing to provide systems and methods overcome the above issues and to enable a graceful transition by addressing reflector discriminator changes to avoid any spurious S-BFD faults, which can further result in a cascaded impact along the network.

BRIEF SUMMARY

The present disclosure focuses on enhancements and improvements to the functionality of Bidirectional Forwarding Detection (BFD) defined in RFC 5880 and Seamless BFD (S-BFD) defined in RFC 7880. In particular, to avoid network instability, the systems and methods of the present disclosure are configured to perform a graceful transition within S-BFD when a specific identifier (e.g., referred to as a "discriminator" in BFD and S-BFD) of a reflecting node (e.g., responding node, echoing node, etc.) is modified. The present systems and methods are configured for enhancing S-BFD to enable a graceful transition when the discriminator value of the reflector node is changed.

According to one implementation, a process may include a step of receiving an entry (e.g., at a responding node, reflector, etc.), wherein the entry is configured to call for a modification of an identification element used for identifying the responding node with respect to other nodes of a network. The entry calls to modify the identification element from an old identifier value to a new identifier value. The process also includes caching the old identifier value and the new identifier value in the memory device. Also, the process includes the step of providing a reply packet back to an initiating node in response to receipt of a request packet from the initiating node. The request packet is related to a connectivity check for testing the connectivity between the initiating node and the responding node. Also, the request packet may identify the responding node by either the old identifier value or the new identifier value.

This connectivity check may be related to the S-BFD protocol defined at least in RFC 7880, whereby the above-mentioned identification element may be related to the S-BFD discriminator. The process may also include the step of initiating a poll sequence procedure as defined in S-BFD to update Your_Discriminator value on the initiating node. The poll sequence procedure may include setting a P bit to 1 and increasing a time interval defined by Min_Rx. In response to receiving a subsequent request packet from the initiating node, the process may further include analyzing the value of a final bit (F) as defined in S-BFD. Then, in response to determining that the F bit is 0, the process may transmit a reply packet with the old identifier value. In response to determining that the F bit is 1, the process may include a) transmitting a reply packet with the new identifier value, b) resetting the F bit to 0, and c) initiating a second poll sequence to set Min_Rx to a desired time interval.

The process may further include the step of providing an Intermediate System to Intermediate System (IS-IS) re-advertisement to change the identification element on the initiating node, whereby the request packet may be configured to identify the responding node by the old identifier value until the initiating node acknowledges the change in the identification element. In some embodiments, the initiating node and responding node may be arranged in different domains. The connectivity check may be configured to test one or more Segment Routing (SR) policy tunnels, Label Switched Paths (LSPs), or Label Distribution Protocol (LDP) routes between the initiating node and responding node.

The process may also include the steps of 1) starting a configurable timer when the identification element is changed. Then, 2) upon receipt of an acknowledgement by the initiating node that the identification element has been changed, the process may a) stop the configurable timer and b) delete the old identifier value from the memory device. Also, 3) upon expiration of the configurable timer, the process may include deleting the old identifier value from the memory device.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
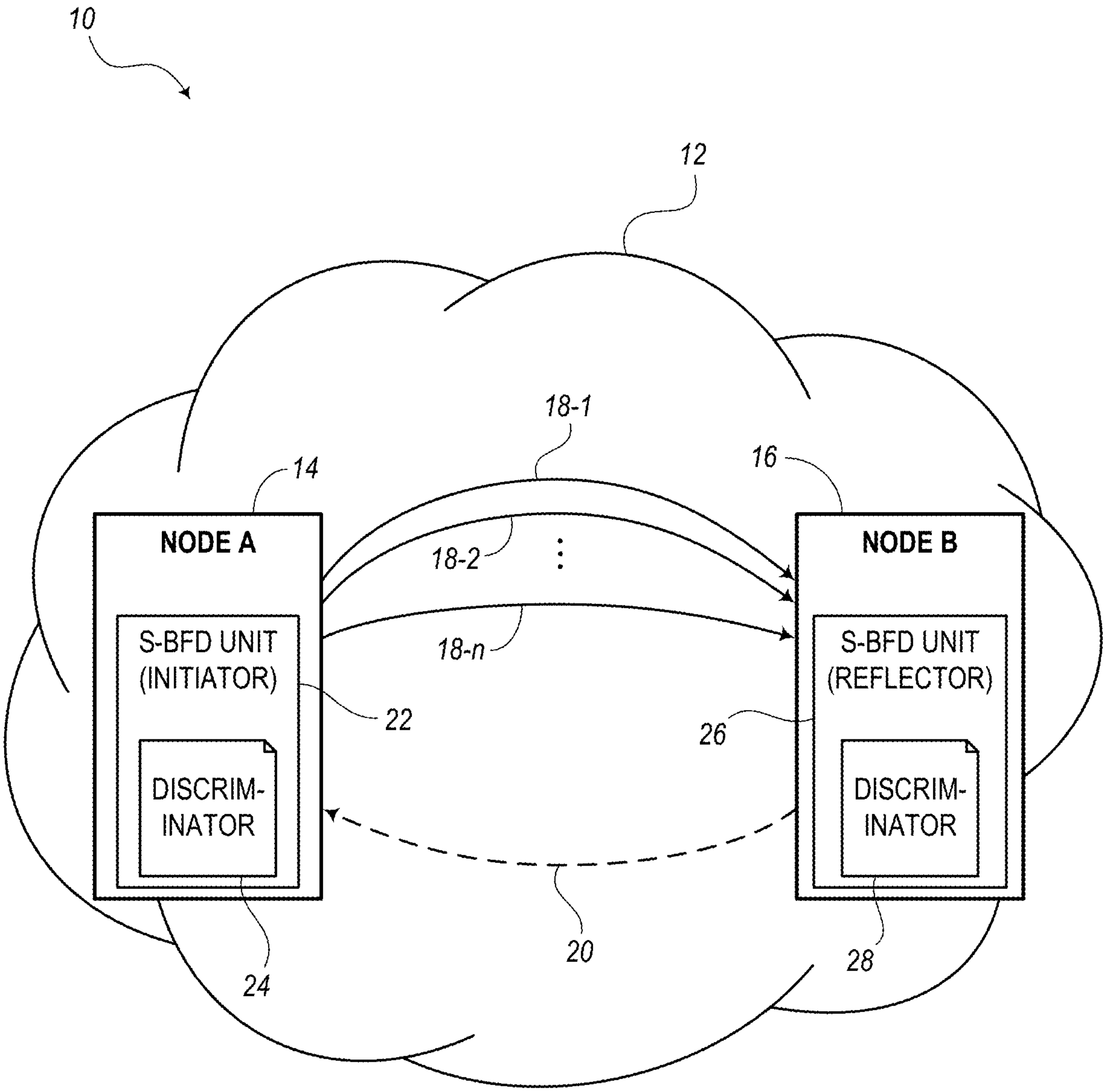
FIG. 1 is a diagram illustrating nodes in an administrative domain of a network for checking the connectivity between the nodes, according to various embodiments.

FIG. 1 is a diagram showing an embodiment of a network 10 including at least a domain 12 (e.g., administrative domain, Intermediate System (IS), Autonomous System (AS), etc.). At least a first node 14 (Node A) and a second node 16 (Node B) are arranged in the domain 12. In this embodiment, a connectivity check is conducted to determine whether one or more paths 18-1, 18-2, . . . , 18-*n* are operational in a first direction from Node A to Node B. A return path 20 may be used to complete the communications between Nodes A and B for conducting the connectivity check. The connectivity check may also be referred to as a connectivity test, reachability test, continuity test, etc.

Node A includes a Seamless Bidirectional Forwarding Detection (S-BFD) unit 22, which, in the example of FIG. 1, acts as an "initiator" as defined in the S-BFD protocol. Also, a discriminator 24, stored in the S-BFD unit 22 of Node A, can be used as an identifier for identifying Node A and distinguishing Node A from other nodes in the network 10.

In addition, Node B includes an S-BFD unit 26, which, in the example of FIG. 1, acts as a "reflector" as defined in the S-BFD protocol. Also, a discriminator 28, stored in the S-BFD unit 26 of Node B, can be used as an identifier for identifying Node B and distinguishing Node B from other nodes in the network 10.

It may be noted that, according to alternative embodiments, the network 10 may include multiple domains and that Nodes A and B may be arranged in different domains. Also, it should be noted that each domain may include any number of nodes and each node may act as an initiator or reflector in different scenarios. It may also be noted that multiple nodes may act as initiators for detecting connectivity with a single reflector node. There can be multiple nodes hosting initiator sessions within the same or different IGP domains (e.g., Intermediate System to Intermediate System (IS-IS) domain, Open Shortest Path First (OSPF) domain, etc.). However, for the sake of simplicity, Nodes A and B are shown as the only nodes of interest in FIG. 1 and are arranged in the same domain 12, while other nodes of the network 10 are not shown.

Nodes A and B are configured to communicate along paths 18-1, 18-2, . . . , 18-*n*, and 20 for conducting the connectivity check protocol (e.g., S-BFD). The initiator (e.g., Node A) is configured to initiate an S-BFD Circuit Connectivity (CC) request packet. The reflector (e.g., Node B) is configured to respond to the CC request packet with an S-BFD CC response packet. The paths 18-1, 18-2, . . . , 18-*n* may be Segment Routing (SR) policy paths addressed by single S-BFD reflector sessions in a single Intermediate System to Intermediate System (IS-IS) administrative domain. In this embodiment, S-BFD may actively monitor SR policies or candidate paths from Node A to Node B. Any change to the S-BFD discriminator value (e.g., identifier) in the reflector (e.g., Node B) from a first value R1 to a second value R2 is handled in the embodiments of the present disclosure so as not to result in S-BFD faults, which thereby provides an improvement over conventional S-BFD operation when the reflector's discriminator changes. Therefore, the embodiments of the present disclosure are configured to provide systems and methods for allowing a graceful transition in S-BFD to address the concern when the reflector's discriminator changes.

S-BFD initiator sessions are configured on Node A to monitor connectivity (e.g., liveness, viability, etc.) corresponding to each path (e.g., SR policy, candidate path, etc.) from Node A to B. An S-BFD reflector session is configured on Node B for responding to the S-BFD CC requests received from each S-BFD initiator session. The return path 20 (e.g., S-BFD return path) can be a policy path or a default IP path.

FIGS. 2A-2D are diagrams illustrating transactions between the first node 14 (e.g., Nodes A acting as the initiator) and the second node 16 (e.g., Node B acting as the reflector). The transactions are conducted for testing the connectivity between the two nodes 14, 16.

Figure 2A:
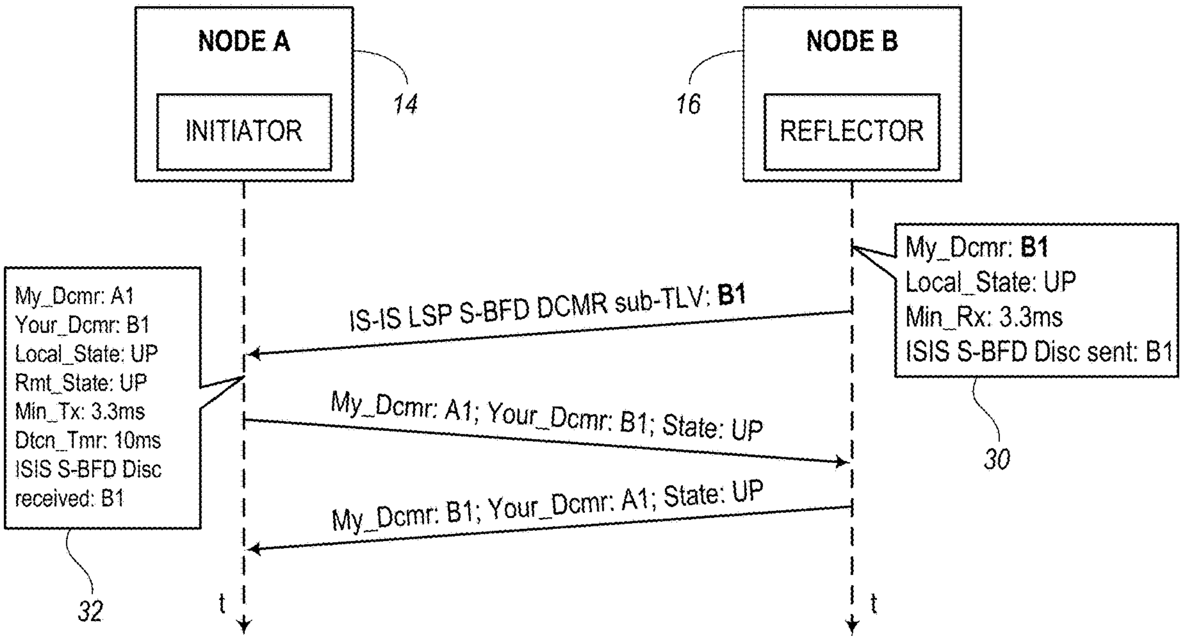
FIGS. 2A-2D are diagrams illustrating transactions between two nodes for testing the connectivity therebetween, according to various embodiments.

FIG. 2A represents a hand-shaking stage. According to some embodiments (e.g., related to various S-BFD methodologies), Node B (reflector) conducts a reflector session 30 with a beginning status where: "My_Discriminator" is B1, the Local State is UP, the Min_Rx=3.3 ms, and the IS-IS S-BFD remote discriminator is B1. These variable are defined, for example, in the S-BFD protocol. For example, "My_Discriminator" refers to whatever node or session is transmitting the packet, while "Your_Discriminator" refers to the remote node to which the packet is intended to be transmitted. The state includes UP and DOWN (e.g., Admin Down), whereby other states defined in classic BFD have been eliminated (thus making S-BFD "seamless"). The Min_Rx is a time interval (in microseconds) between received request packets from the initiator.

In response to receiving the reflector session 30 variables, Node A conducts an initiator session 32 with a beginning status where: "My_Discriminator" is A1, Your_Discriminator is B1, the Local State is UP, the Remote State is UP, Min_Tx (e.g., the transmit rate) is 3.3 ms, the Detection Timer=3*3.3 ms=about 10 ms, and S-BFD Discriminator received from IS-IS is B1. Node A sends My_Dcmr: A1; Your_Dcmr: B1; State: UP to Node B. Having received the discriminator and state from Node A, Node B sends My_Dcmr: B1; Your_Dcmr: A1, State: UP to Node A. These last two transmissions can be repeatedly passed back and forth to continually check the connectivity between Nodes A and B.

Figure 2B:
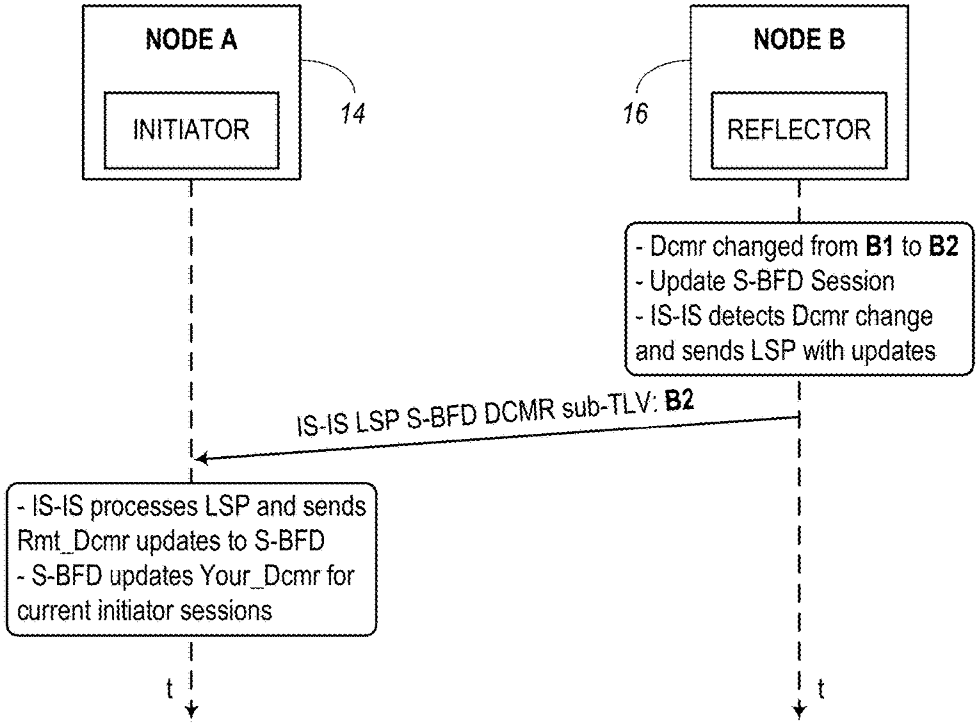

FIG. 2B represents a stage, during normal connectivity checking, where the discriminator on the reflector (Node B) is changed. In this example, the discriminator B1 is changed (e.g., by a user, network operator, admin, etc.) to a new value "B2." The reflector updates the S-BFD session (e.g., in hardware and/or software). Also, the local IS-IS detects the discriminator change and sends an LSP with updated information. The local IS-IS sends the updated information: IS-IS LSP S-BFD discriminator sub-TLV with a value B2 (new discriminator value) to Node A. On the remote side, Node A includes a procedure where the local IS-IS processes the LSP and sends Remote_Discriminator updates to S-BFD. The S-BFD updates Your_Discriminator for the current initiator sessions.

Figure 2C:
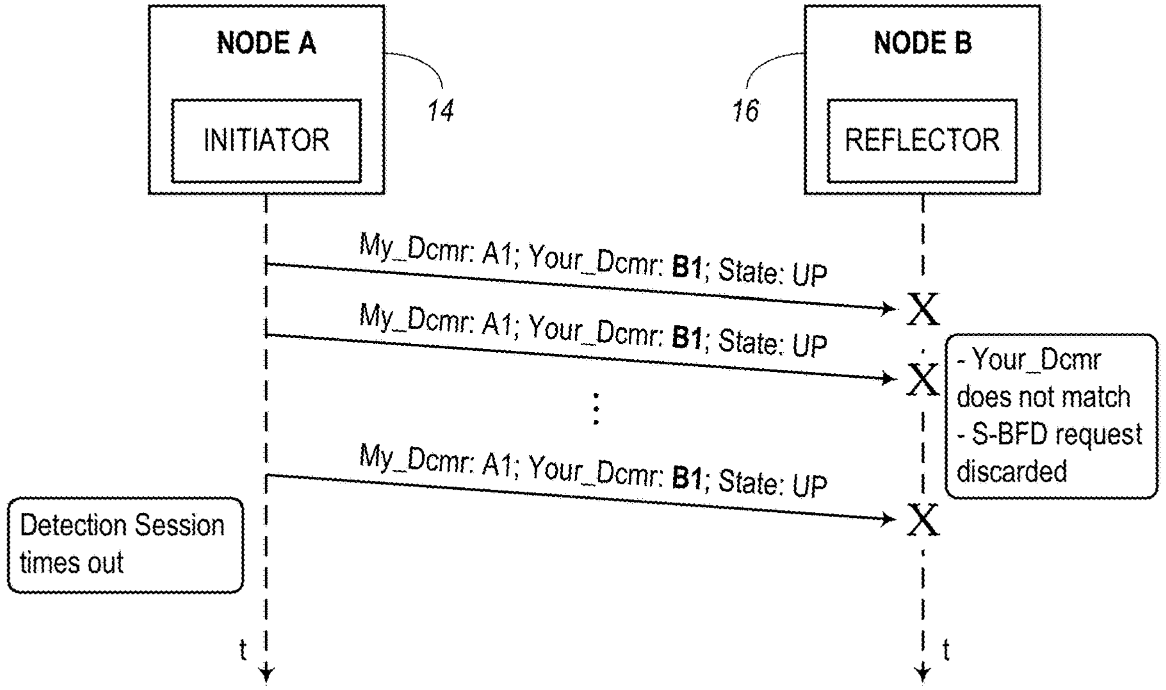

However, while the steps of FIG. 2B are being executed, the steps shown in FIG. 2C are also executed concurrently. For example, as shown in FIG. 2C, Node A sends My_Discriminator as A1, Your_Discriminator as B1, and the State as UP. However, since Node B at this point has already experienced the discriminator change and sees the discriminator value as being invalid, it therefore does not respond to the session where "Your_Discriminator" is still B1. Since Your_Discriminator (i.e., B1) does not match the new discriminator (i.e., B2) of Node B, the S-BFD request is discarded. Thus, this situation represents a potential issue with conventional S-BFD. As shown in FIG. 2C, the same transmission is attempted multiple times, but is rejected every time because of the discriminator change. Finally, after the configured Detection Time has expired, the Detection Session of Node A times out and does not attempt the connectivity check with Node B. Therefore, if the S-BFD (i.e., last step in FIG. 2B) is unable to update the Your_Discriminator before the Detection Session (FIG. 2C) times out, then the conventional systems can have a problem.

Figure 2D:
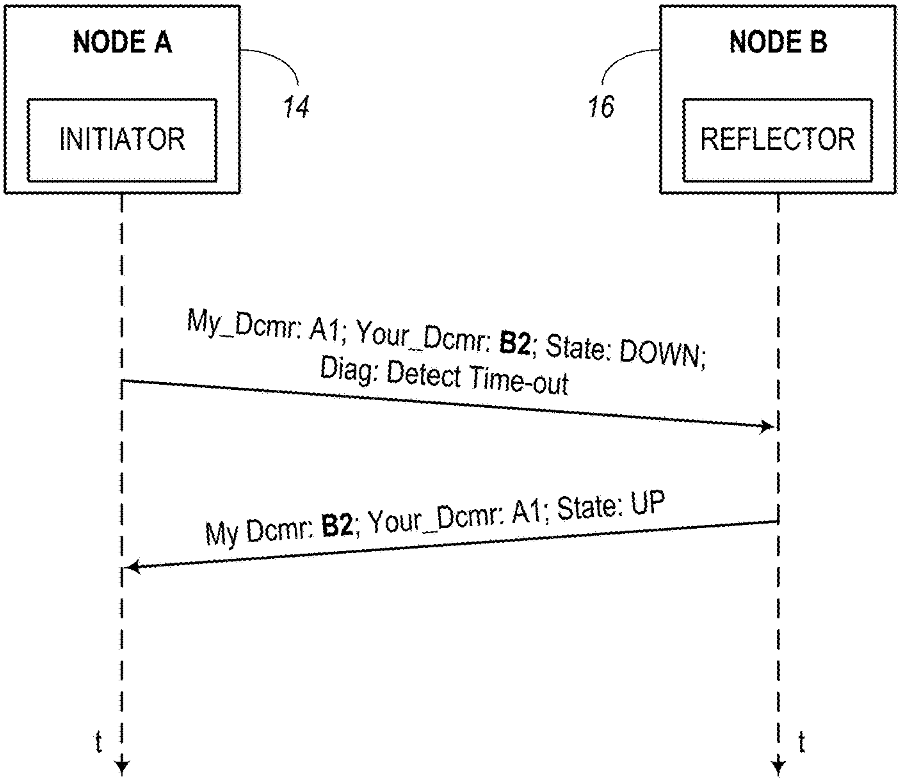

Finally, as shown in FIG. 2D, when Node A updates the Your_Discriminator (i.e., after the last step in FIG. 2B and after the Detection Session times out), Node A sends My_Discriminator as A1, Your_Discriminator as B2 (the new value), changes the state to DOWN, and sends a diagnostic ("diag") message (e.g., as defined in S-BFD) to indicate the Detection Time-Out. Node B then starts the process over with the reply of My_Discriminator: B2; Your_Discriminator: A1; and State: UP. Nodes A and B are then able to recover and continue the connectivity testing. However, the recovery may include network flapping and unnecessarily complex processing. Therefore, the systems and methods of the present disclosure are configured to overcome the difficulties of the conventional S-BFD operation, as described with respect to FIGS. 2A-2D.

Figure 3:
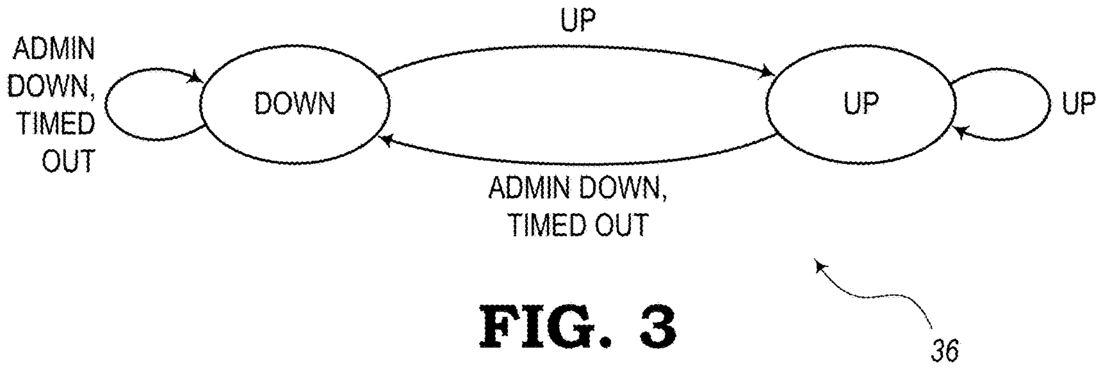
FIG. 3 is a state diagram similar to the S-BFD protocol for determining the state of the nodes, according to various embodiments.

FIG. 3 is a state diagram 36 similar to the S-BFD protocol for determining the state of the nodes. The S-BFD unit 22 (FIG. 1) may be a "persistent" session on the initiator (Node A) with a timer for S-BFD request packet transmissions in a periodic pattern or may be configured without a timer to transmit S-BFD request packets "when needed" (e.g., based on stateless operation). For the stateful or persistent sessions, the initiator may use the state machine 36 of FIG. 3, which eliminates the INIT state described in BFD (i.e., RFC 5880). The notation on each arc represents the state of the initiator (as received in the state field in the S-BFD reply packet) or indicates the expiration of the Detection Timer.

Figure 4:
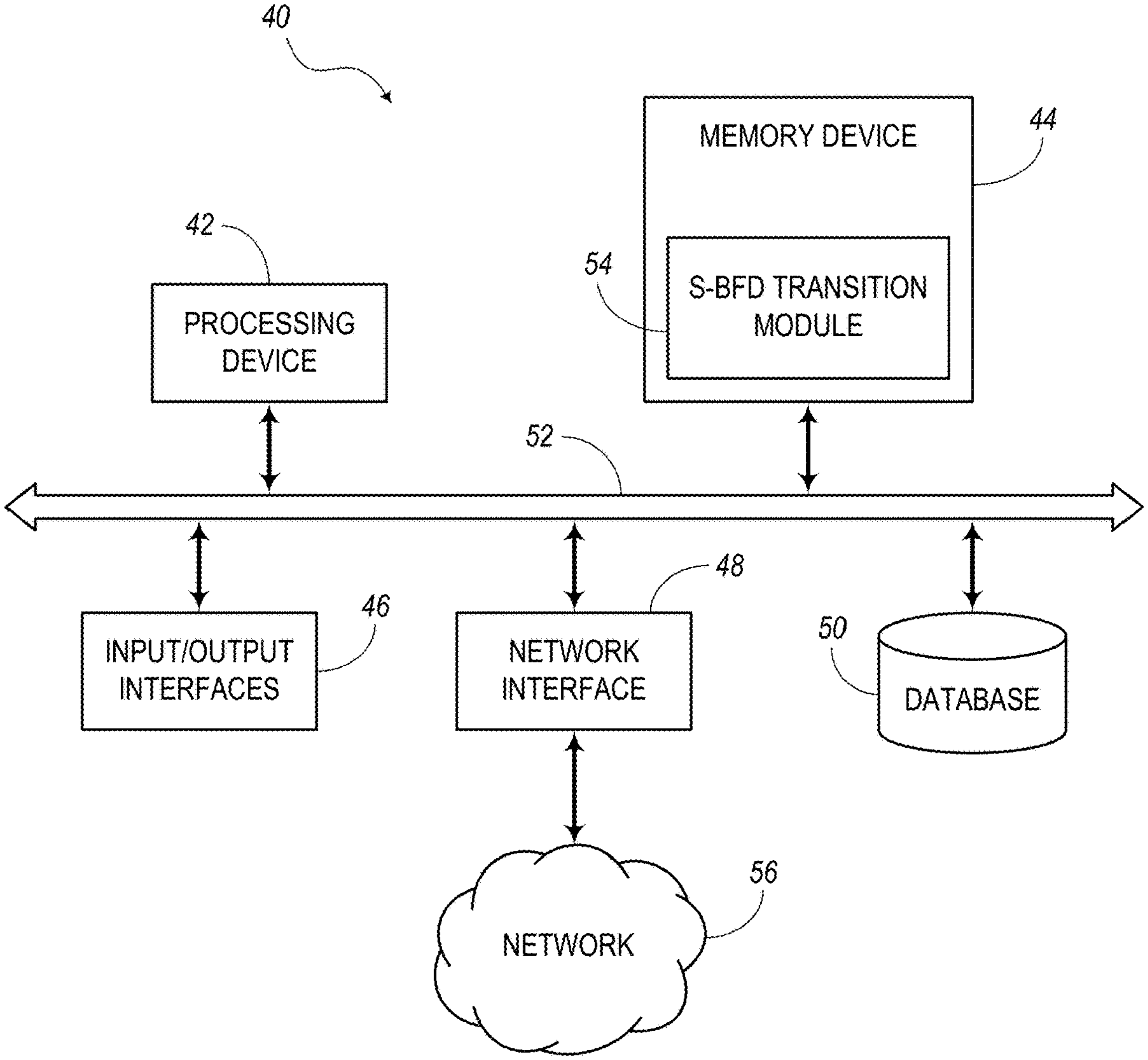
FIG. 4 is a block diagram illustrating a reflector node used in a S-BFD connectivity checking arrangement, according to various embodiments.

FIG. 4 is a block diagram illustrating an embodiment of a reflector 40 (e.g., S-BFD reflector node, Node B, etc.) used in a connectivity checking (e.g., S-BFD) arrangement. In the illustrated embodiment, the reflector 40 may be a digital computing device that generally includes a processing device 42, a memory device 44, Input/Output (I/O) interfaces 46, a network interface 48, and a database 50. It should be appreciated that FIG. 4 depicts the reflector 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 48, 50.

It should be appreciated that the processing device 42, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 42 may also include or utilize stored program instructions (e.g., stored in hardware, software, and/or firmware) for control of the reflector 40 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 44 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 44 may incorporate electronic, magnetic, optical, and/or other types of storage media. The memory device 44 may have a distributed architecture, where various components are situated remotely from one another, but can be accessed by the processing device 42.

The memory device 44 may include a data store, database (e.g., database 50), or the like, for storing data. In one example, the data store may be located internal to the reflector 40 and may include, for example, an internal hard drive connected to the local interface 52 in the reflector 40. Additionally, in another embodiment, the data store may be located external to the reflector 40 and may include, for example, an external hard drive connected to the Input/Output (I/O) interfaces 46 (e.g., SCSI or USB connection). In a further embodiment, the data store may be connected to the reflector 40 through a network and may include, for example, a network attached file server.

Software stored in the memory device 44 may include one or more programs, each of which may include an ordered listing of executable instructions for implementing logical functions. The software in the memory device 44 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 42), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 42 or other suitable circuitry or logic). For example, when executed, the instructions may cause or enable the processing device 42 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 42), or any suitable combination thereof. Software/firmware modules may reside in the memory device 44, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 46 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 46 may include, for example, one or more of a serial port, a parallel port, a Small Computer System Interface (SCSI), an Internet SCSI (ISCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 48 may be used to enable the reflector 40 to communicate over a network, such as the network 10, the Internet, a Wide Area Network (WAN), a Local Area Network (LAN), and the like. The network interface 48 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 48 may include address, control, and/or data connections to enable appropriate communications on the network 10.

Furthermore, the reflector 40 includes an S-BFD transition module 54, which can be implemented in any combination of hardware, software, or firmware. When implemented in hardware, the S-BFD transition module 54 may be configured in the processing device 42. When implemented in software or firmware, the S-BFD transition module 54 may be stored in any suitable non-transitory computer-readable media, such as the memory device 44. The S-BFD transition module 54 may include one or more computer programs, logic, and/or instructions configured to enable or cause the processing device 42 (or other processors) to execute certain steps or actions related to transitioning S-BFD sessions in response to a change in the discriminator value of a reflector node (e.g., reflector 40).

For example, the S-BFD transition module 54 may be configured to enable the processing device 42 to receive an entry (e.g., from a user via the I/O interfaces 46), where the entry is configured to call for a modification of an identification element (e.g., discriminator) used for identifying a responding node (e.g., reflector 40) with respect to other nodes of a network. The entry calls to modify the identification element from an old identifier value to a new identifier value. Then, the S-BFD transition module 54 is configured to enable the processing device 42 to cache the old identifier value and the new identifier value. These values may be stored in the memory device 44 and/or database 50. When the transition is complete and the old identifier value is no longer needed, it can be deleted from the memory. After storing the two identifier values, the S-BFD transition module 54 is configured to enable the processing device 42 to provide a reply packet (e.g., via the network interface 48) back to an initiating node (e.g., Node A) in response to receipt of a request packet from the initiating node. For example, the request packet may be related to a connectivity check for testing the connectivity between the initiating node (e.g., Node A) and the responding node (e.g., Node B, reflector 40, etc.). The request packet can identify the responding node by either the old identifier value or the new identifier value.

Thus, the reflector 40 (or other node deployed with the S-BFD transition module 54 shown in FIG. 4) is able to perform real-time updates in the remote discriminator value in S-BFD packets originated by the initiator based on an S-BFD response by the reflector 40. This can be done instead of using the IGP/BGP re-advertisement for S-BFD discriminator change. However, IGP/BGP updates may optionally be used as reconciliation mechanism for the already updated remote discriminator value.

The S-BFD transition module 54 is configured to leverage the S-BFD "poll sequence" mechanism described in RFC 7880. This allows the S-BFD transition module 54 to gracefully update the remote discriminator value on the initiator without any spurious faults. In some embodiments, updating the new discriminator value of the reflector 40 on the initiator can be triggered on receipt of either 1) an IGP/BGP advertisement or 2) an S-BFD reply packet, whichever arrives first. In either case, the initiator can program the received reflector discriminator value in a "Your_Discriminator" field in its S-BFD session.

Figure 5:
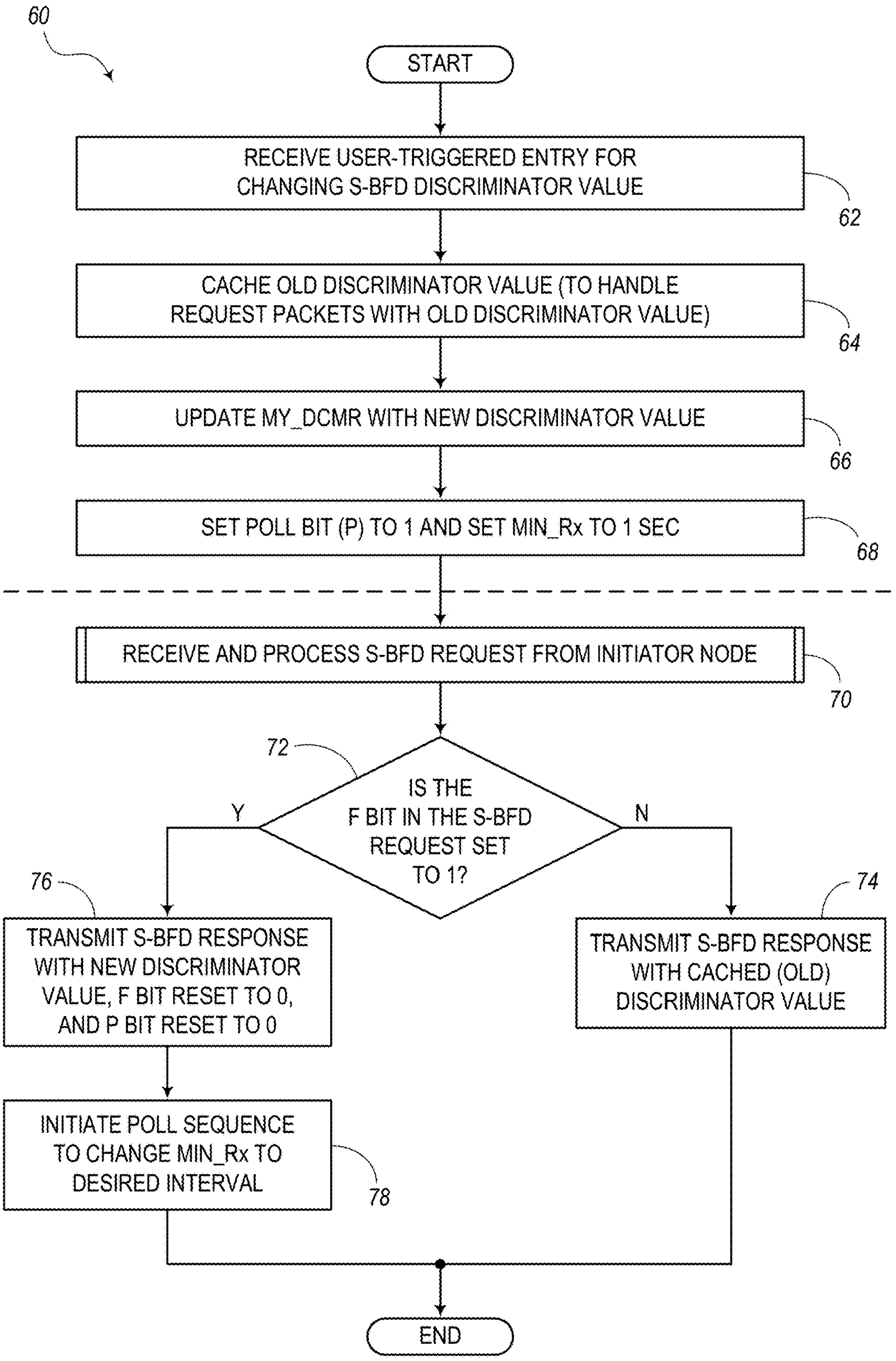
FIG. 5 is a flow diagram illustrating a process for performing actions to enhance S-BFD for enabling a graceful transition when the discriminator value of the reflector node is changed, according to various embodiments.

FIG. 5 is a flow diagram illustrating an embodiment of a process 60 for performing actions to enhance S-BFD for enabling a graceful transition when the discriminator value of the reflector node (e.g., reflector 40) is changed. The process 60 includes the step of receiving a user-triggered entry for changing the S-BFD discriminator value (of the reflector), as indicated in block 62. The process 60 also includes caching the old discriminator value, which can be used in some cases for handling request packets using this old discriminator value, as indicated in block 64. By making the old value available, the situation shown in FIG. 2C can be avoided, whereby Node B (reflector) would normally discard the mismatched identifiers.

The process 60 also includes updating the My_Discriminator field with the new discriminator value, as indicated in block 66. In some embodiments, a buffer stack can be used for storing the new discriminator and one or more old discriminators. For example, if the buffer includes storage space for two data entries, just the new discriminator and the most recent old discriminator might be stored. When another new discriminator is place on top of the stack, the oldest entry can be pushed out (discarded). Then, the process 60 includes the step of setting the poll bit (P), which is related to the poll sequence defined in RFC 7880, to 1 and setting the Min_Rx, which is also defined in RFC 7880, to a sufficient time to enable one or more initiators to update the Your_Discriminator field with the new value. For example, in some embodiments, the sufficiently long time may be one second, two seconds, or other time interval. This concludes the set-up sub-routine of the process 60.

After set-up, the process 60 includes waiting to receive an S-BFD request from a corresponding initiator node and processing this request, as indicated in block 70. When the S-BFD request is received, the process 60 includes determining if the final bit (F), as define in RFC 7880, in the S-BFD request has been set (by the initiator) to 1, as indicated in the detection diamond 72. If the F bit is not set to 1, which means that the initiator has not yet received and processed the poll bit (P) set to 1, then the process 60 goes to block 74, which includes the step of transmitting the S-BFD response with the cached (old) discriminator value. This action is configured to overcome the conventional S-BFD process whereby the time periods represented by FIGS. 2B and 2C would overlap and cause mismatch problems.

If it is determined in detection diamond 72 that the F bit in the S-BFD request has been set to 1, which means that the initiator has received and processed the poll bit (P) (having been set to 1) for initiating the poll sequence, then the process 60 goes to block 76. Block 76 includes the steps of transmitting the S-BFD response with the new discriminator value, resetting the F bit to 0, and resetting the P bit to 0. Since the initiator has returned the F bit=1, this can be interpreted as the initiator having received the new discriminator value as well and being able to respond when the new discriminator is included in the S-BFD response. After sending the S-BFD response, the process 60 includes initiating another poll sequence to change the Min_Rx to a desired interval (e.g., 33 ms), which had been changed to a sufficiently long time interval (e.g., 1 sec) in the first pol sequence to allow the initiator (or initiators) to make the transition of updating the Your_Discriminator for the specific reflector (i.e., which is configured to perform the process 60).

In some embodiments, the S-BFD transition module 54 may be configured to enable or cause the processing device 42 to execute the process 60, in part or in whole. The process 60 may be considered to be a cleanup mechanism to overcome the transition difficulties of the conventional S-BFD procedures. The process 60 allows the reflector 40 to cache its old and new discriminator values in hardware and/or software and can be configured to optimize the hardware resources.

For example, the optimization of hardware resources may include the use of a "configurable" timer associated with the memory device 44, database 50, buffer, cache, or other suitable storage device. The storage device is configured to store the new discriminator indefinitely, but may be configured to hold onto the old discriminator for a limited time that is long enough to enable the related initiators to gracefully transition to the new discriminator value of the related reflector.

This timer associated with the cached (old) discriminator value may work as follows. When the reflector discriminator value changes, the old value is cached and the timer is reset to a certain reasonable time (e.g., one second) and then started. Upon receiving an S-BFD request packet with the new value in Your_Discriminator, the old value is deleted from the storage device and the timer is stopped. Upon the timer reaching its expiration (e.g., one second), the old value is deleted from the storage device. After either one of these scenarios, the reflector session would have fully migrated to the new discriminator value.

Figure 6A:
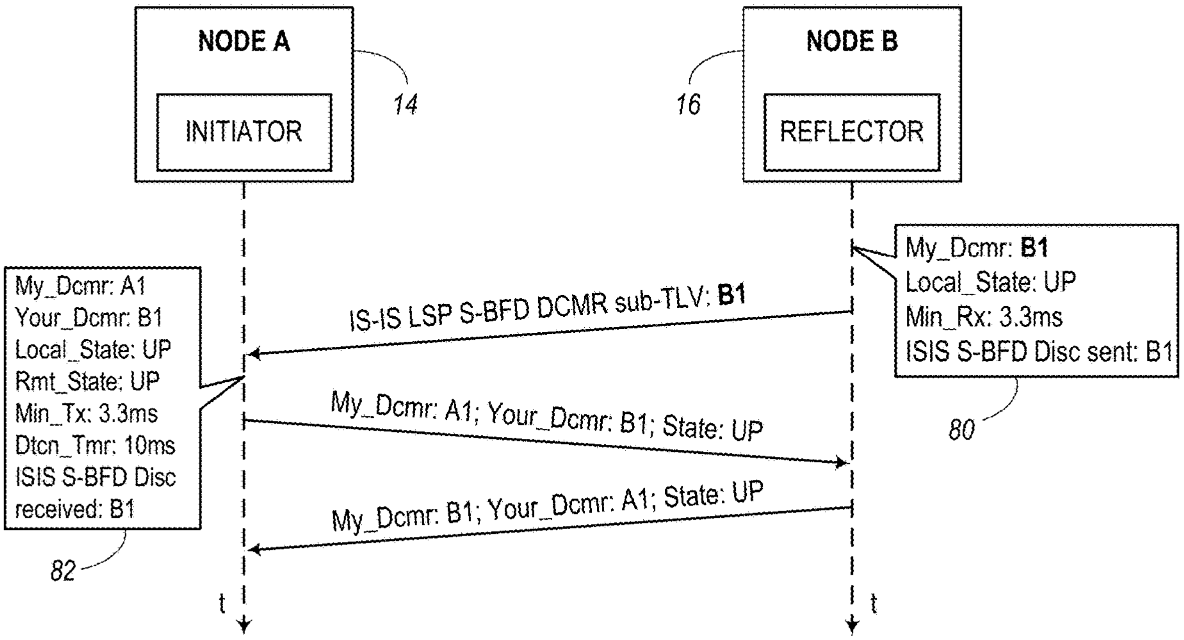
FIGS. 6A-6C are diagrams illustrating transactions between two nodes for testing the connectivity therebetween for enabling a graceful transition when the discriminator value of the reflector node is changed, according to various embodiments.
Figure 6B:
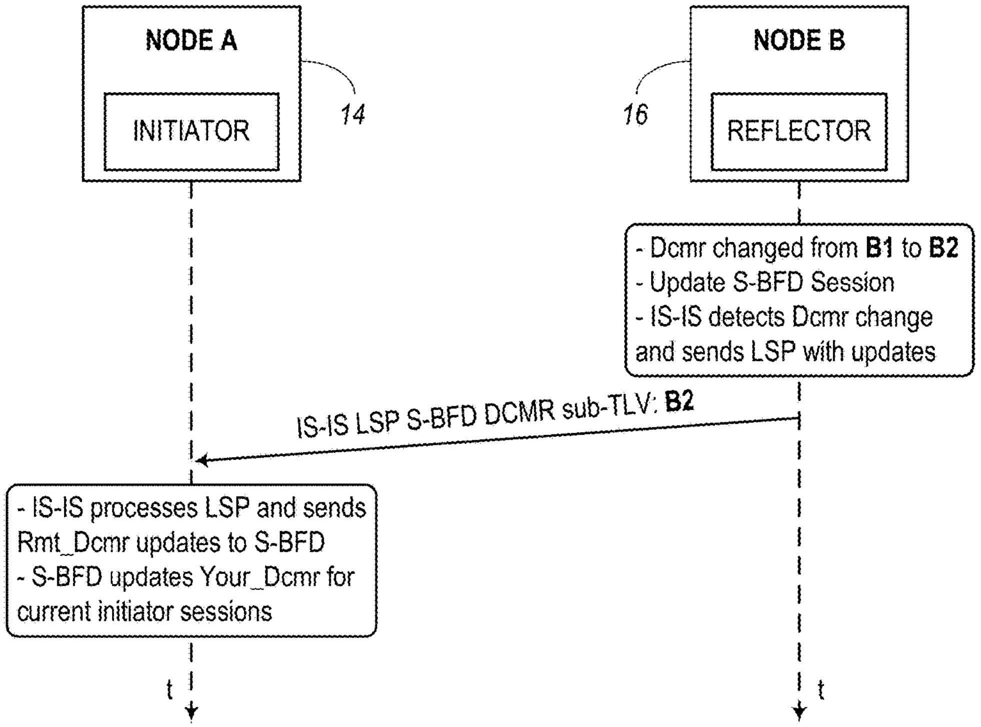
Figure 6C:
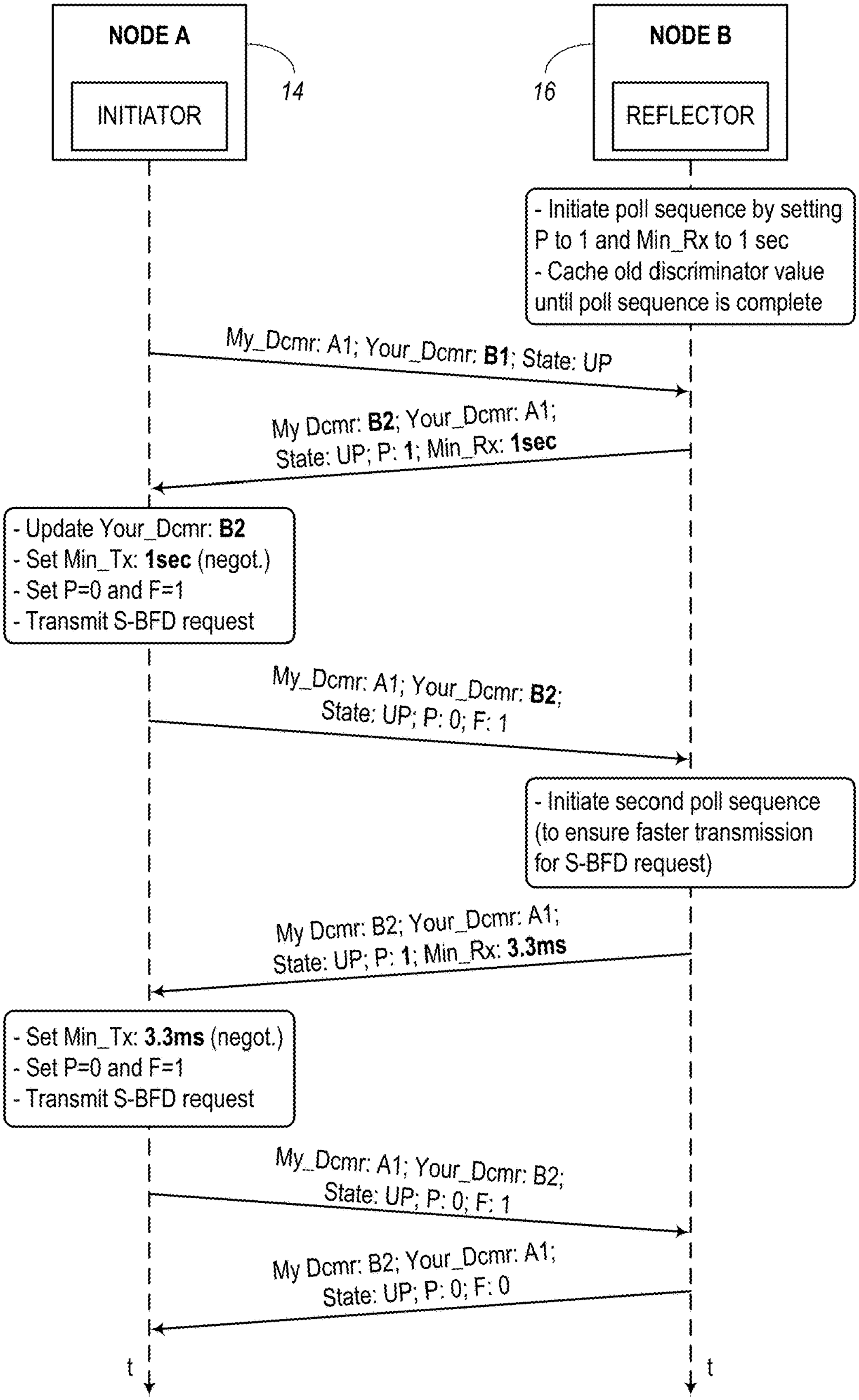

FIGS. 6A-6C are diagrams illustrating an embodiment of transactions between two nodes (e.g., Node A (initiator) and Node B (reflector)) for testing the connectivity therebetween. However, the transactions of FIGS. 6A-6C show an improvement over the conventional procedure of FIGS. 2A-2D and instead are configured to enable a graceful transition when the discriminator value of the reflector node (Node B) is changed. It may be noted that FIGS. 6A-6C are described with respect to modifications or enhancements to the S-BFD protocol. However, in other embodiments, the same or similar actions can be performed with respect to any suitable connectivity testing protocols.

FIG. 6A is similar to the hand-shaking stage of FIG. 2A. In this implementation, Node B (reflector) conducts a reflector session 80 with a beginning status where: "My_Discriminator" is B1, the Local State is UP, the Min_Rx=3.3 ms, and the S-BFD discriminator transmitted using IS-IS is B1. In response to receiving the reflector session 80 variables, Node A conducts an initiator session 82 with a beginning status where: "My_Discriminator" is A1, Your_Discriminator is B1, the Local State is UP, the Remote State is UP, Min_Tx (e.g., the transmit rate) is 3.3 ms, the Detection Timer=3*3.3 ms=about 10 ms, and S-BFD Discriminator received from IS-IS is B1. Node A sends My_Dcmr: A1; Your_Dcmr: B1; State: UP to Node B. Having received the discriminator and state from Node A, Node B sends My_Dcmr: B1; Your_Dcmr: A1, State: UP to Node A. These last two transmissions can be repeated continuously to provide an ongoing connectivity check between Nodes A and B.

FIG. 6B is similar to the transaction stage of FIG. 2B, which may occur during the normal connectivity checking of FIG. 6A. However, as an interruption to the continuous connectivity checking, the discriminator on the reflector (Node B) is changed. In this example, the discriminator value B1 is changed (e.g., by a user, network operator, admin, etc. associated with Node B) to a new discriminator value "B2." The reflector updates the S-BFD session (e.g., in hardware and/or software). Also, the local IS-IS detects the discriminator change and sends an LSP with updated information. For example, the local IS-IS may send the updated information: IS-IS LSP S-BFD discriminator sub-TLV with a value "B2" (the new discriminator value) to Node A. On the remote side, Node A includes a procedure where the local IS-IS processes the LSP and sends Remote_Discriminator updates to S-BFD. The S-BFD updates Your_Discriminator for the current initiator sessions.

According to the present disclosure, the transactions between Nodes A and B include a graceful transition. This graceful transition of FIG. 6C differs from the awkward transition stages of FIGS. 2C and 2D of the conventional S-BFD procedures whereby multiple S-BFD requests are discarded because of discriminator mismatches.

As shown in FIG. 6C, the graceful transition can be started immediately after the discriminator is changed from B1 to B2. Node B is configured to initiate a poll sequence by setting the P bit (flag) to 1 and setting the Min_Rx to a time interval that would allow the initiator nodes to be updated with the new discriminator value (e.g., one second). In some embodiments, Node B may also start a timer (e.g., corresponding to the Min_Rx time interval), whereby the old discriminator may be discarded after the timer has timed out or after the initiators have provided acknowledgement that they are updated with the new discriminator value.

Also, at this point in time, instead of deleting the old discriminator value altogether, as is done in conventional system and may result in an awkward transition, Node B is configured to cache the old discriminator value until the poll sequence is complete (e.g., when the respective initiators acknowledge the poll sequence and return a Final bit (F) set to 1) and/or when the timer has run out.

In response to receiving the Your_Discriminator of B1, Node B is configured to transmit a new session update with the My_Discriminator set to B2, Your_Discriminator still set to A1, the state still set to UP, P bit set to 1, and the Min_Rx set to 1 sec (or other suitable time interval). The Node A, regardless of whether it is equipped with the S-BFD transition module 54 or not, is configured to act according to normal S-BFD behavior by updating the Your_Discriminator value to B2, setting the newly negotiated Min_Tx to the extended time interval of 1 sec, acknowledging the setting of the P bit being set to 1 and resetting the P bit to 0, acknowledging to polling sequence by setting the final bit F to 1, and transmitting the S-BFD request. The request packet includes My_Discriminator with value A1, Your_Discriminator with value B2, the state still set to UP, the P bit cleared, and the F bit set to 1.

When Node B receives the F bit set to 1, indicating acknowledgement of the update of the reflector's new discriminator value, Node B knows at this time that the update has been made with Node A. Similar actions can be performed for receiving acknowledgements from other relevant initiators.

At this time, Node B can then initiate a second poll sequence to replace the transition time period with a desired time interval for normal operation thereafter. This second poll sequence is configured to ensure faster transmissions for the S-BFD requests. Node B sends session packet with My_Discriminator having value B2, Your_Discriminator having value A1, the state remaining UP, the P bit set to 1, and the Min_Rx set to a desired time interval (e.g., 3.3 ms).

In response to the second poll sequence, Node A sets the Min_Tx to the newly negotiated time interval of 3.3 ms, clears the P bit to 0, sets the F bit to 1, and transmits the S-BFD request back to Node B. The request in this case includes My_Discriminator of A1, Your_Discriminator of B2, the state still UP, P=0, and F=1. In response, Node B clears the P and F bits, and normal connectivity checking can continue with the minimum time interval of 3.3 ms.

It may be noted that the graceful transition of FIG. 6C does not require either the initiator or reflector to experience the timed out situation shown in the state diagram of FIG. 3, based on repeated S-BFD requests being discarded as shown in FIG. 2C, whereby the state of the node would be transitioned from UP to DOWN and would need to be forced back to the UP state. In other words, the graceful transition is configured to avoid this issue and keep the nodes in the UP state throughout the process, even when the discriminator value of the reflector is changed. Also, the diagnostic ('diag") values described in S-BFD for communicating the timed-out situation would not be needed in the graceful transition of FIG. 6C since this situation is avoided. It should also be noted that the systems and methods of the present disclosure are configured to overcome the conventional issues with respect to network flapping, complex processing, and manual recovery.

Figure 7:
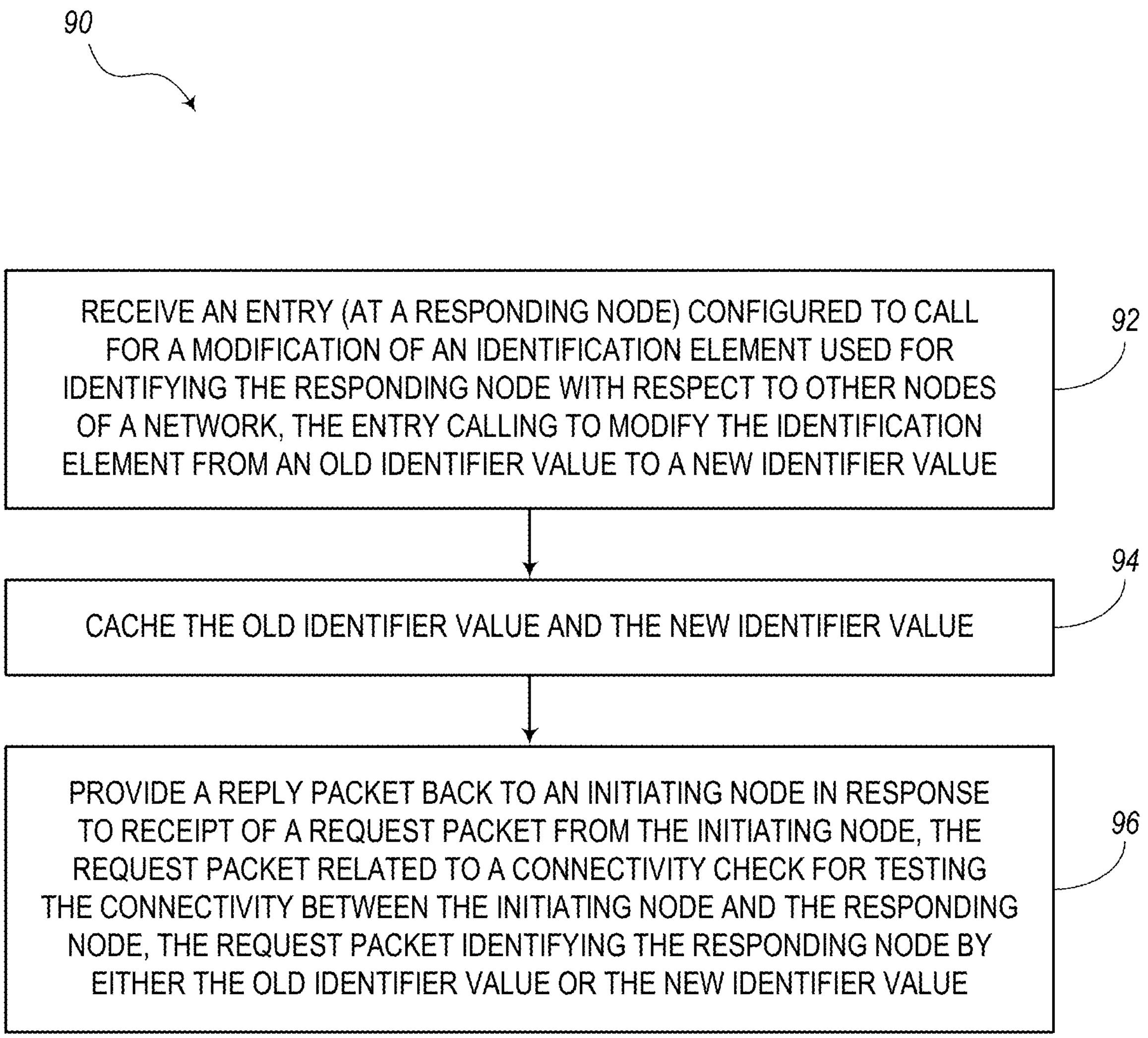
FIG. 7 is a flow diagram illustrating another process for enhancing S-BFD to enable the graceful transition when the discriminator value of the reflector node is changed, according to various embodiments.

FIG. 7 is a flow diagram illustrating another embodiment of a process 90 for enhancing S-BFD. The process 90 is configured to enable a graceful transition when the discriminator value of the reflector node is changed. In this embodiment, the process 90 includes the step of receiving an entry (e.g., at a responding node, reflector, etc.), as indicated in block 92, wherein the entry is configured to call for a modification of an identification element used for identifying the responding node with respect to other nodes of a network (e.g., network 10). The entry calls to modify the identification element from an old identifier value to a new identifier value. The process 90 also includes caching the old identifier value and the new identifier value in the memory device, as indicated in block 94. Also, the process 90 includes the step of providing a reply packet back to an initiating node in response to receipt of a request packet from the initiating node, as indicated in block 96. The request packet is related to a connectivity check for testing the connectivity between the initiating node and the responding node. Also, the request packet may identify the responding node by either the old identifier value or the new identifier value.

This connectivity check may be related to the Seamless Bidirectional Forwarding Detection (S-BFD) protocol defined at least in RFC 7880, whereby the above-mentioned identification element may be related to the S-BFD discriminator. The process 90 may also include the step of initiating a poll sequence procedure as defined in S-BFD to update Your_Discriminator value on the initiating node. The poll sequence procedure may include setting a P bit to 1 and increasing a time interval defined by Min_Rx. In response to receiving a subsequent request packet from the initiating node, the process 90 may further include analyzing the value of a final bit (F) as defined in S-BFD. Then, in response to determining that the F bit is 0, the process 90 may transmit a reply packet with the old identifier value. In response to determining that the F bit is 1, the process 90 may include a) transmitting a reply packet with the new identifier value, b) resetting the F bit to 0, and c) initiating a second poll sequence to set Min_Rx to a desired time interval.

The process 90 may further include the step of providing an Intermediate System to Intermediate System (IS-IS) re-advertisement to change the identification element on the initiating node, whereby the request packet may be configured to identify the responding node by the old identifier value until the initiating node acknowledges the change in the identification element. In some embodiments, the initiating node and responding node may be arranged in different domains. The connectivity check may be configured to test one or more Segment Routing (SR) policy tunnels, Label Switched Paths (LSPs), or Label Distribution Protocol (LDP) routes between the initiating node and responding node.

The process 90 may also include the steps of 1) starting a configurable timer when the identification element is changed. Then, 2) upon receipt of an acknowledgement by the initiating node that the identification element has been changed, the process 90 may a) stop the configurable timer and b) delete the old identifier value from the memory device. The process 90 may also include the step of 3) upon expiration of the configurable timer, deleting the old identifier value from the memory device.

Therefore, the systems and methods of the present disclosure are configured to enhance S-BFD to account for the situation where the discriminator value of the reflector (or responding node) is changed. In response, the present implementations include performing the graceful transition as described herein to update one or more initiator nodes with the new discriminator value.

The solution provided by the embodiments of the present disclosure enable a user (e.g., network operator, administrator, etc.) to update S-BFD discriminator values on the fly without any spurious S-BFD faults or service switchovers. By employing the present systems and methods, the graceful transition processes can result in better network stability. Also, the solutions provided herein allow the S-BFD reflector to cache the old discriminator value to thereby allow the reflector to continue to respond to S-BFD request packets from the initiator node until the initiator node acknowledges this new discriminator value. In addition to the S-BFD initiator node being configured to set the reflector's discriminator value advertised by IGP or BGP, the systems and methods of the present disclosure are configured to use the received My_Discriminator value in the S-BFD request packet, whichever arrives first.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A node configured to operate in a network, the node is a Seamless Bidirectional Forwarding Detection (S-BFD) reflector node configured to operate an S-BFD session with an S-BFD initiator node, and the node comprising circuitry configured to:

responsive to an S-BFD discriminator change in the S-BFD session to a new discriminator for the S-BFD session, cache an old discriminator for the S-BFD session, and receive, process, and respond to a S-BFD request from the S-BFD initiator node with an S-BFD response including one of the new discriminator or the old discriminator.

2. The node of claim 1, wherein the circuitry is further configured to set a timer for the cached old discriminator.

3. The node of claim 1, wherein the S-BFD response includes the one of the new discriminator or the old discriminator based on settings in the S-BFD request.

4. The node of claim 3, wherein the settings are an F bit.

5. The node of claim 1, wherein the circuitry is further configured to implement an S-BFD poll sequence with the S-BFD initiator node to gracefully update a discriminator value on the S-BFD initiator node.

6. The node of claim 1, wherein the S-BFD discriminator change is performed at the node prior than at the S-BFD initiator node.

7. The node of claim 1, wherein the S-BFD discriminator change is user enabled.

8. A method implemented by a node configured to operate in a network, the node is a Seamless Bidirectional Forwarding Detection (S-BFD) reflector node configured to operate an S-BFD session with an S-BFD initiator node, and the method comprising steps of:

responsive to an S-BFD discriminator change in the S-BFD session to a new discriminator for the S-BFD session, caching an old discriminator for the S-BFD session; and receiving, processing, and responding to a S-BFD request from the S-BFD initiator node with an S-BFD response including one of the new discriminator or the old discriminator.

9. The method of claim 8, wherein the circuitry is further configured to set a timer for the cached old discriminator.

10. The method of claim 8, wherein the S-BFD response includes the one of the new discriminator or the old discriminator based on settings in the S-BFD request.

11. The method of claim 10, wherein the settings are an F bit.

12. The method of claim 8, wherein the circuitry is further configured to implement an S-BFD poll sequence with the S-BFD initiator node to gracefully update a discriminator value on the S-BFD initiator node.

13. The method of claim 8, wherein the S-BFD discriminator change is performed at the node prior than at the S-BFD initiator node.

14. The method of claim 8, wherein the S-BFD discriminator change is user enabled.

15. A non-transitory computer-readable medium configured to store computer logic having instructions that, when executed, enable a processing device to perform steps of:

the processing device is in a node configured to operate in a network, the node is a Seamless Bidirectional Forwarding Detection (S-BFD) reflector node configured to operate an S-BFD session with an S-BFD initiator node, responsive to an S-BFD discriminator change in the S-BFD session to a new discriminator for the S-BFD session, caching an old discriminator for the S-BFD session; and receiving, processing, and responding to a S-BFD request from the S-BFD initiator node with an S-BFD response including one of the new discriminator or the old discriminator.

16. The non-transitory computer-readable medium of claim 15, wherein the circuitry is further configured to set a timer for the cached old discriminator.

17. The non-transitory computer-readable medium of claim 15, wherein the S-BFD response includes the one of the new discriminator or the old discriminator based on settings in the S-BFD request.

18. The non-transitory computer-readable medium of claim 15, wherein the circuitry is further configured to implement an S-BFD poll sequence with the S-BFD initiator node to gracefully update a discriminator value on the S-BFD initiator node.

19. The non-transitory computer-readable medium of claim 15, wherein the S-BFD discriminator change is performed at the node prior than at the S-BFD initiator node.

20. The non-transitory computer-readable medium of claim 15, wherein the S-BFD discriminator change is user enabled.

* * * * *